United States Patent [19]

Flournoy, Jr.

[11] Patent Number: 4,659,131
[45] Date of Patent: Apr. 21, 1987

[54] RACK FOR A PICK-UP TRUCK

[76] Inventor: Walker R. Flournoy, Jr., Rt. 1, Box 120, Hamilton, Ga. 31811

[21] Appl. No.: 804,106

[22] Filed: Dec. 3, 1985

[51] Int. Cl.$^4$ .............................................. B60D 3/00
[52] U.S. Cl. ....................................................... 296/3
[58] Field of Search .......................... 296/3; 280/79.3; 211/195, 198

[56] References Cited

U.S. PATENT DOCUMENTS

| | | | |
|---|---|---|---|
| 2,947,566 | 8/1960 | Tower | 296/3 |
| 3,460,864 | 8/1969 | Piercy | 296/3 |
| 3,572,742 | 3/1971 | Marker | 280/79.3 |
| 3,765,713 | 10/1973 | Suitt | 296/3 |
| 3,891,262 | 6/1975 | Brunel | 296/3 |
| 3,946,876 | 3/1976 | Jay | 211/195 |
| 4,057,281 | 11/1977 | Garrett | 296/3 |
| 4,093,082 | 6/1978 | Goodsell | 296/3 |
| 4,211,448 | 7/1980 | Weston | 296/3 |
| 4,398,763 | 8/1983 | Louw | 296/3 |
| 4,405,170 | 9/1983 | Raya | 296/3 |
| 4,509,787 | 4/1985 | Knaack et al. | 296/3 |

Primary Examiner—Robert B. Reeves
Assistant Examiner—Carol L. Olson
Attorney, Agent, or Firm—Watson, Cole, Grindle & Watson

[57] ABSTRACT

A collapsible rack adapted for installation over the bed of a pick-up truck to allow the truck to transport elongated articles such as ladders and pipes. The rack is collapsible to a position such that a portion of the rack is supported by the sidewalls of the bed so as to allow essentially unlimited access to the truck bed when in the collapsed position.

5 Claims, 6 Drawing Figures

RACK FOR A PICK-UP TRUCK

BACKGROUND OF THE INVENTION

The present invention relates generally to carrier racks for supporting elongated objects on pick-up trucks and, more specifically, to such racks which are collapsible from an upright position to a position where a portion of the rack rests upon the sidewalls of the truckbed.

Various racks have long been known for installation over the bed of a pick-up truck to enable the truck to transport elongated articles such as ladders, pipes and the like which are too long to be accommodated in the truck bed. Such racks allow the articles to extend over the cab of the truck and still be adequately and stably supported over their entire length.

A majority of known racks for pick-ups comprise at least four upright members secured in some fashion to the bed of the truck and a plurality of cross-members extending between the tops of the upright members, both above the sidewalls of the bed and across the width of the bed. Examples of such racks are shown in U.S. Pat. No. 2,947,566 to Tower, U.S. Pat. No. 3,765,713 to Suitt, and U.S. Pat. No. 4,509,787 to Knaack. While such racks function satisfactorily for their intended purpose, it is oftentimes necessary to remove the rack so that large or odd shaped objects can be carried in the bed of the truck. The generally fixed construction of the rack renders the task of removal quite cumbersome and storage of the rack after removal presents a problem. If the uprights are fixedly secured to the truck bed, the removal of the rack is even more complicated.

Collapsible racks for pick-up trucks are also known in the art as exemplified by U.S. Pat. No. 3,460,864 to Piercy and U.S. Pat. No. 4,057,281 to Garrett. While the collapsible nature of the racks eliminates some of the problems associated with the removal of racks of fixed or semi-fixed construction, their structure tends to be complicated, and the process of collapsing the rack is time-consuming, and storage of some rack components is inconvenient.

SUMMARY OF THE INVENTION

It is therefore a feature of the present invention to provide a collapsible rack for a pick-up truck which is of a simplified construction.

It is another feature of the present invention to provide a collapsible rack for a pick-up truck which is easy to collapse.

It is yet another feature of the present invention to provide a collapsible rack for a pick-up truck which provides a stable surface for the support of elongated articles.

A further feature of the invention is to provide a collapsible rack for a pickup truck wherein all components of the rack can be conveniently stored when the rack is in the collapsed position.

Briefly, the present invention in its broader aspects comprehends a collapsible rack adapted for installation over a bed portion of a pick-up truck, the rack comprising a pair of front upright members, a pair of central upright members each comprising two portions hinged together, a pair of rear upright members each comprising two portions hinged together, two front frame members each releasably secured to a front upright member, and pivotly attached to a central frame member, two rear frame members each pivotly attached to a central frame member and a rear frame member, and three cross-members each extending between a pair of upright members.

Further objects, advantages and features of the present invention will become more fully apparent from a detailed consideration of the arrangement and construction of the constituent parts as set forth in the following description taken together with the accompanying drawing.

DETAILED DESCRIPTION OF THE PREFERRED EMBODIMENTS

Figure 1:
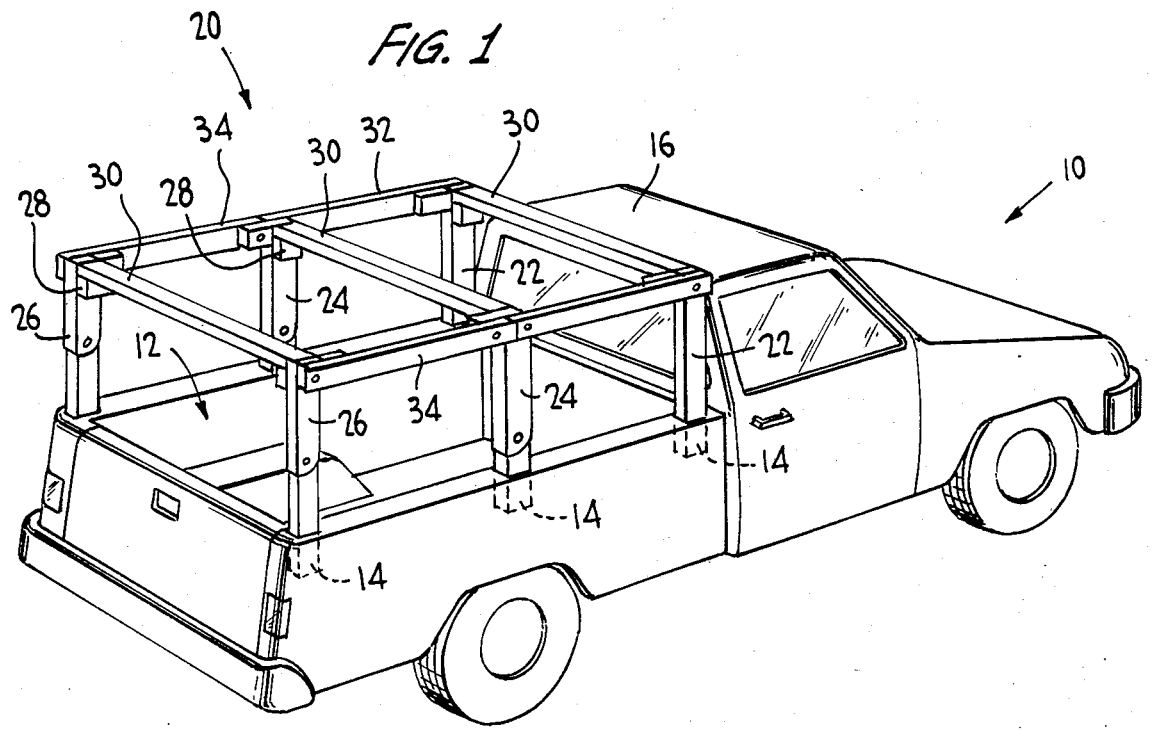
FIG. 1 is a perspective view of a collapsible rack according to the present invention, the rack being shown in its upright position as mounted over the bed of a pick-up truck.

Referring now to FIG. 1, shown is conventional type of pick-up truck 10 having collapsible rack 20 according to the invention mounted over bed 12 of the truck. Rack 20 provides supporting surfaces such that elongated articles (not shown) such as pipes, ladders and the like which are too long to easily fit within bed 12 can be transported by truck 10.

Rack 20 in this preferred embodiment comprises pairs of upright front members 22, central upright members 24 and rear upright members 26, each of the upright members extending into and supported by stake socket 14 formed in the side walls of truck bed 12. Upright members 22, 24, and 26 are of a sufficient length that the top of rack 20 is higher than cab 16 of truck 10 so that long articles can be easily accommodated by the rack.

Each of upright members 22, 24 and 26 includes support block 28 located near the top of the upright member. Extending between each pair of upright members 22, 24 and 26 is a cross-member 30 supported at each end by support block 28. Cross-members 30 can be releasably secured to blocks 28 by various means such as protrusions, projections, pins and the like.

Rack 20 further includes pair of front frame members 32 and pair of rear frame members 34 extending essentially parallel to the top of the sidewalls of bed 12, the front frame members interconnecting the top portions of front upright members 22 and central upright members 24 and the rear frame members interconnecting the top portions of the central upright members and rear upright members 26. Rear frame members 34 are pivotally connected to central and rear upright members 24 and 26. Frame members 32 are pivotally connected to central upright members 24 and are releasably secured to front upright members 22.

Figure 2:
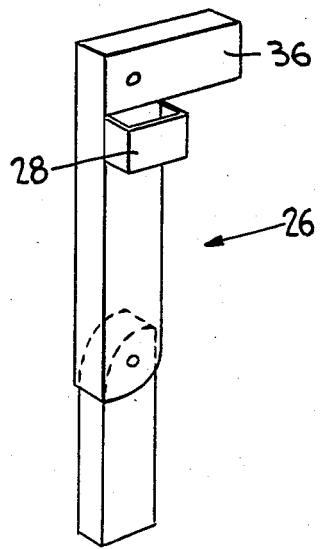
FIG. 2 is a perspective view of one embodiment of a rear upright member for the rack of the invention.

As is best shown in FIG. 2, rear upright members 26 are each hinged approximately at the midpoint of the member. In addition, rear upright members 26 include flange portion 36 extending approximately perpendicular to the major axis of the member. Rear member 26 as illustrated is adapted for installation on the far side of truck bed 12 shown in FIG. 1, the rear upright member adapted for the near side would have support block 28 on the opposite side of the member.

Preferably, hinged portion of rear upright member 26 is constructed such that the top portion of the member can rotate only to one side, e.g., to the right as shown in FIG. 2, by the use of cooperating stops and the like. Alternatively, a bore hole (not shown) could be provided through the overlapping portions of rear upright member 26 and a pin inserted through the hole to releasably lock the two portions of the member 26 relative to each other. Either provision improves the stability of rack 20. The same constructions could also be incorporated into central upright member 24.

Figure 3:
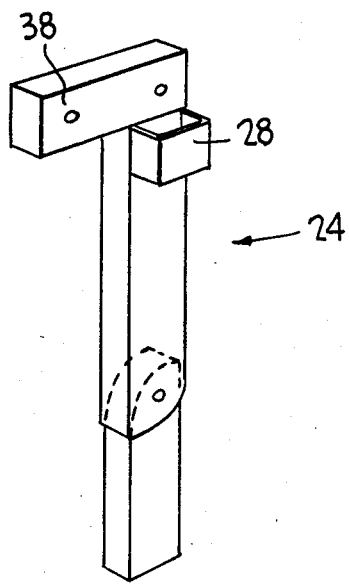
FIG. 3 is a perspective view of one embodiment of a central upright member used in the rack of the invention.

Like rear upright members 26, central upright members 24 as illustrated in FIG. 3 is also hinged along its major axis and includes flanged portion 38. However, the location of the hinge on middle support members 24 is somewhat lower than that for rear upright members 26 and the flanged portion 38 projects in the opposite direction. The central upright member 24 shown in FIG. 3 is, like member 26 of FIG. 2, adapted for installation on the far side of truck bed 12 as shown in FIG. 1, and thus the central support member for the near side would have support block 28 located on the opposite surface of the member.

Figure 4:
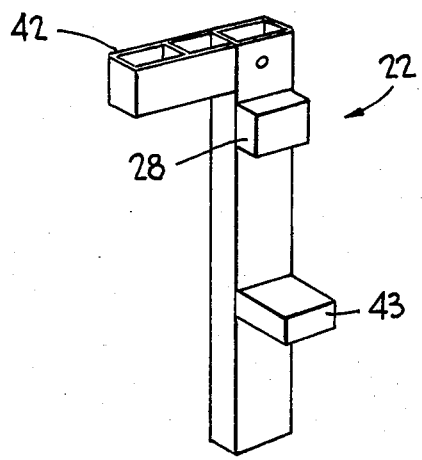
FIG. 4 is a perspective view of one embodiment of a front upright member for use in the rack of the invention.

Unlike rear upright members 26 and central upright members 24, front upright members 22 are not hinged and also do not include a flanged portion as is shown in FIG. 4. Front upright members 22 do include support block 28 and also include extension 42 projecting laterally from the member, the extension having two downwardly-opening cavities. One of the front upright members 22 may include receptacle 43 for storage of the various fastening means which are used in the assembly of rack 20.

Figure 5:
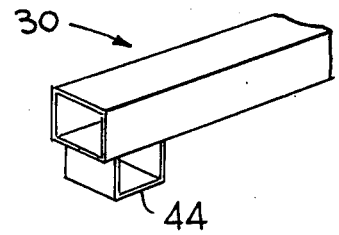
FIG. 5 is a perspective view of a portion of one embodiment of a cross-member used in the rack, and FIG. 6. is a partial perspective view of the truck and rack shown in FIG. 1, the rack being shown in the collapsed position.

FIG. 5 illustrates a preferred means for securing cross-members 30 to upright members 24 and 26. Each end of cross-member 30 is provided with a downwardly-projecting protrusion 44 which is adapted to fit within a complementary recess in support block 28 on upright members 24 and 26. While this means may also be used with cross-member 30 supported by front upright members 22, it is presently preferred that the cross-member be permanently secured to the front upright members by welding and the like.

Figure 6:
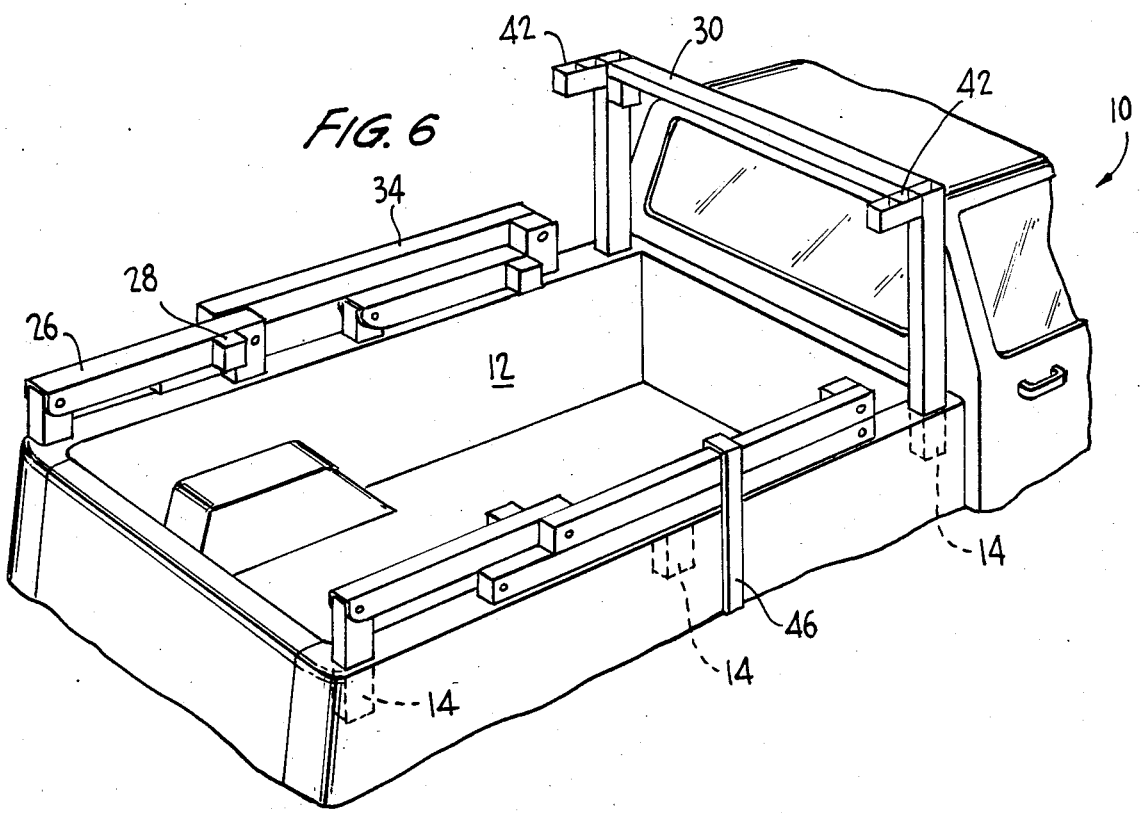

FIG. 6 illustrates rack 20 in its collapsed position. Generally, to go from the upright position shown in FIG. 1 to that of FIG. 6, one simply removes cross-members 30 from uprights 24 and 26, releases front frame members 32 from front upright member 22 and allows middle and rear upright members 24 and 26 to fold forwardly about their hinges while swinging the front frame members to a position beneath rear frame members 34 such that this portion of the rack is supported by the top of the sidewalls of truck bed 12. It should be noted that flange portions 36 of rear upright members 26, by being approximately the same length as the portion of rear upright member below the hinge, allow rack 20 to be collapsed in an essentially horizontal position. Those cross-members 30 which have been removed are conveniently stored by mounting protrusions of the cross-members on extensions 42 of the front upright members 22. The collapsed portion of rack 20 may be secured to bed 12 by elastic straps 46 engaging suitable fasteners (not shown) on the bed.

Preferably, the various members forming rack 20 are made of metal tubing having a rectangular cross-section, aluminum being a presently preferred metal due to its light weight. For example, the members can be made of 2 in. by 1½ in. aluminum tubing having a wall thickness of about ⅛ in.

As is apparent from the above, rack 20 according to the present invention is of simple and inexpensive construction, is easily secured to a pick-up truck and can be conveniently collapsed to allow essentially unlimited access to the truck bed. Furthermore, the rack, from the collapsed position, can be erected to an upright position in a short period of time.

While there has been shown and described what is considered to be preferred embodiments of the present invention, it will be apparent to those skilled in the art that various changes and modifications may be made therein without departing from the invention as defined in the appended claims.

It is claimed:

1. A collapsible rack adapted for installation over a bed portion of a pick-up truck, the rack comprising a pair of front upright members, a pair of central upright members each comprising two portions hinged together, a pair of rear upright members each comprising two portions hinged together, two front frame members each releasably secured to a front upright member and pivotally attached to a central frame member, two rear frame members each pivotally attached to a central frame member and to a rear upright member, and three cross-members each extending between a pair of upright members, the cross-members extending between the pair of central upright members and between the pair of rear upright members being releasably secured to the respective upright members.

2. A rack in accordance with claim 1, wherein the cross-members extending between the pair of central upright members and the pair of rear upright members have projections near their ends which are adapted to engage recesses on the upright member to which they extend.

3. A rack in accordance with claim 2, wherein the front upright members each include an extension having at least two cavities, each adapted to receive a protrusion of a cross-member.

4. A rack in accordance with claim 1, wherein the cross-member extending between the pair of front upright members is fixedly secured to the front upright members.

5. A rack in accordance with claim 1, wherein each of the rear upright members includes a flange portion extending transverse to the major dimension of the rear upright member.

* * * * *